United States Patent [19]

Palmer et al.

[11] 4,416,915

[45] Nov. 22, 1983

[54] METHOD OF MAKING CHALCOGENIDE CATHODES

[75] Inventors: David N. Palmer, Tolland; Gary W. Ferrell, Collinsville, both of Conn.

[73] Assignee: Combustion Engineering, Inc., Windsor, Conn.

[21] Appl. No.: 345,605

[22] Filed: Feb. 4, 1982

[51] Int. Cl.³ .............................................. B05D 5/12
[52] U.S. Cl. ............................. 427/126.3; 427/126.1; 427/247; 427/295; 427/377; 427/380; 427/385.5; 427/387; 427/388.1; 427/388.5; 429/103; 429/218
[58] Field of Search ............... 427/126.1, 126.3, 126.5, 427/126.6, 247, 295, 377, 380, 385.5, 387, 388.1, 388.5; 429/218, 103

[56] References Cited

U.S. PATENT DOCUMENTS

| | | | |
|---|---|---|---|
| 3,898,096 | 8/1975 | Heredy et al. | 429/103 |
| 3,925,098 | 12/1975 | Saunders et al. | 429/103 |
| 3,933,520 | 1/1976 | Gay et al. | 429/103 |
| 4,143,217 | 3/1979 | Joo et al. | 429/218 |
| 4,144,383 | 3/1979 | Joo et al. | 429/218 |
| 4,166,160 | 8/1979 | Chianelli et al. | 429/218 |
| 4,229,509 | 10/1980 | Margalit | 429/218 |
| 4,310,609 | 1/1982 | Liang et al. | 429/218 |
| 4,340,652 | 7/1982 | Raistrick et al. | 429/218 |

*Primary Examiner*—Norman Morgenstern
*Assistant Examiner*—Richard Bueker
*Attorney, Agent, or Firm*—Brumbaugh, Graves, Donohue & Raymond

[57] ABSTRACT

A chalcogenide cathode is made by applying a slurry of a mixture containing at least one intercalatable layered transition metal chalcogenide cathode active material, a conductivity enhancing agent and a binding agent in a vehicle therefor to a high porosity current collector substrate which has been previously treated by applying and drying an adhesion promoting agent thereon and then heating the substrate in an inert atmosphere to drive off the vehicle and coalesce the binding agent.

4 Claims, No Drawings

METHOD OF MAKING CHALCOGENIDE CATHODES

The present invention relates to a method of making chalcogenide cathodes.

The use of di- and tri-chalcogenides or other materials capable of reversibly intercalating lithium atoms into the Van der Waals areas separating the lamellar regions of these materials as cathode active materials in cathodes for lithium non-aqueous secondary energy storage cells or primary energy conversion devices could lead to devices of exceptionally high energy densities compared to conventional ambient and above ambient operating assemblies (~200 W-hr/liter or ~300 W-hr/kg). However, the simple incorporation into a current collector substrate of a compression compact comprising a cathode active material, a cathode depolarizer or conductivity enhancing agent and a binder material results in a cathode that is of sufficiently high density to prevent complete communication of electrolyte-solvent mixtures throughout the bulk of the cathode.

Poor communication of the electrolyte-solvent mixture which carries lithium ions for eventual intercalation into the cathode active material results in underutilization of the full theoretical energy storage capacity of the cells. This is so because the energy storage capacity as defined by the energy density is a function of the stoichiometry of the lithium intercalate compound formed during the discharge of a secondary battery. Furthermore this situation creates cells that have high resistance to current flow and display low current densities.

In order to rectify these deficiencies, it would be appropriate to create a cathode with high porosity so as to allow extensive electrolyte-solvent communication throughout the bulk of the cathode. High porosity would also increase cathode real surface area which in turn would greatly improve cell current density.

In order to accomplish these objectives, a high porosity cathode has been fabricated using a high porosity (a high surface area) current collector substrate. However, to do this the cathode active material must have strong adhesion to the current collector substrate so as to withstand the cyclic expansion and contraction associated with intercalation (discharge) and de-intercalation (charge) reactions occurring in the cell during active service. In order to render the cathode active material stable to cyclic pertubations, the cathode active material must be used in conjunction with a binding agent and an adhesion promoting agent so as to have strong adhesion to the high porosity current collector substrate. In addition the cathode active material plus the binder agent and adhesion promoting agent must be used in conjunction with a conductivity enhancing agent (cathode depolarizer) to aid electron conduction between the intercalation host and the current collector substrate throughout the bulk of the cathode. High cathode porosity also increases cathode real surface area and ultimately improves cell current density.

In general, the present invention provides a method of making a chalcogenide cathode which comprises:
(a) forming a mixture containing at least one intercalatable layered transition metal chalcogenide cathode active material, a conductivity enhancing agent and a binding agent;
(b) forming a slurry containing the mixture and a vehicle therefor;
(c) treating a high porosity current collector substrate by applying an adhesion promoting agent thereon and drying the treated substrate;
(d) applying the slurry to the treated and dried substrate; and
(e) heating the substrate in an inert atmosphere to drive off the vehicle and coalesce the binding agent.

More particularly, the present invention provides a method of making a chalcogenide cathode which comprises:
(a) forming a mixture containing from about 45% to about 90% by weight of at least one intercalatable layered transition metal chalcogenide cathode active material, from about 1% to about 46% by weight of a conductivity enhancing agent and from about 1% to about 10% by weight of a binding agent;
(b) forming a slurry containing from about 20% to about 80% by weight of the mixture and from about 80% to about 20% by weight of a vehicle therefor;
(c) treating a high porosity current collector substrate having about 10–1000 pores per square inch by applying an adhesion promoting agent thereon in an amount of from about 5% to about 35% by weight and drying the treated substrate;
(d) applying the slurry to the treated and dried substrate for a weight pickup of from about 10 mg/cm$^2$ to about 300 mg/cm$^2$; and
(e) heating the substrate in an inert atmosphere at a temperature of from about 10° C. to about 350° C. to drive off the vehicle and coalesce the binding agent.

The mixture can be formed by mixing, blending, working or similar procedures. The slurry can be formed by adding the mixture to the vehicle or vice versa with agitation. The adhesion promoting agent can be applied to the high porosity current collector and the slurry can be applied to the treated and dried substrate by washing, spraying, brushing, dipping, impregnating or similar procedures.

Suitable components utilized in the method of the present invention are exemplified below.

CATHODE ACTIVE MATERIALS

Intercalatable layered transition metal chalcogenide cathode active materials and cathodes for lithium non-aqueous secondary batteries containing such materials are well known and are disclosed, for example, in U.S. Pat. Nos. 4,009,052; 4,049,879; 4,049,887; 4,198,476; 4,206,276; 4,207,245; 4,228,226; and 4,233,377. Such materials include the di-, tri- and mixed chalcogenides (e.g., oxides, sulfides, selenides, tellurides) of the transition metals of Groups 1b to 7b and 8 of the Periodic Table of Elements (e.g., titanium, vanadium, tantalum, chromium, cobalt, nickel, manganese, niobium, ruthenium, molybdenum, hafnium, zirconium and tungsten). These materials can further contain phosphorus or a halide (bromine, chlorine, iodine). Preferred cathode active materials are titanium disulfide and/or titanium trisulfide.

CONDUCTIVITY ENHANCING AGENTS OR CATHODE DEPOLARIZERS

Useful conductivity enhancing agents or cathode depolarizers (for assisting in the conduction of electrons to current collector substrate and external leads) include the following:
- high conductivity carbon blacks or graphite
- 6–25% Ag plated glass, nickel or similar compounds
- 6–25% Ag plated on polymers
- titanium carbide
- tantalum carbide
- niobium carbide
- zirconium carbide
- tungsten carbide
- molybdenum disilicide
- metal powders
- high conductivity metal plated glass or ceramic fibers or ceramic powders
- boron carbide, graphite or carbon fibers or fibrils of high surface area.

All conductivities should be less than 4600 microhm-cm (indicated as volume resistivities). Preferred conductivity enhancing agents are carbon black and titanium carbide.

BINDING AGENTS

Useful binding agents (for cohesive formation of cathode bulk in a continuous film and for adhesion) include the following:
- polyethylene or similar related polyolefin thermoplastics
- polytetrafluoroethylene and related halogen containing polymers
- polyphenylene sulfide
- polyacetylene, polymethyl pentene
- polycarbonates, polystyrene
- polyimidazoles, polyphosphonitrilic polymers
- polyamides, poly(amide-imides)
- polyimides, polysiloxanes, polyaramides
- polyesters, polycarbonates
- polyarylethers, polyarylsulfones, polysulfones, polyether sulfones
- polyarylesters, polyether and ester urethanes, acrylic polymers
- inorganic silicates and sulfides
- polysulfides
- polyvinyl alcohols, polyphenolic and epoxy compounds
- polypyrroles, polyallomers, alkyd polymers, polyacetal compounds
- polyphenylene oxides
- glassy amorphous metals and similar inorganic compounds
- other thermoplastic or thermosetting resins, or inorganic compounds.

The only limitation to the use of any of these binding agents is the compatability of the binding agent with the cathode active material and with the non-aqueous solvent used in the secondary non-aqueous battery. The binding agent should not impede the layered structure of the cathode active material and should not interfere with the intercalation of anode-like cations.

Preferred binding agents are polyethylene and polytetrafluoroethylene.

VEHICLES

Useful vehicles (for slurrying the mixtures) include the following:
- polyglycols, glycol ethers, glycols, glycol esters, e.g., butyl Carbitol
- ketones, e.g., acetone
- alcohols, e.g., ethyl alcohol
- esters, e.g., ethyl acetate
- cyclic or acyclic ethers, e.g., dioxolane
- aromatic solvents, e.g., benzene, toluene.

Preferred vehicles are butyl Carbitol (i.e., diethylene glycol butyl ether) and acetone.

HIGH POROSITY CURRENT COLLECTOR SUBSTRATES

Useful high porosity current collector substrates include the following:
- foamed nickel or similar foamed metals
- foamed glass that has been plated with an inert or noble metal to increase surface conductivity
- foamed polymers containing a surface or bulk conductivity agent
- foamed Ti-, Nb-, Zr-, W-, Ta-carbides
- foamed molybdenum disilicide
- reduced metal reacted molecular or carbosieves
- carbon, graphite or viterous carbon fiber or fibril laminates of ultrahigh surface area.

All high porosity current collector substrates should be 97% to 90% porous or 3% to 10% dense with 10 to 1000 pores per square inch or sufficient surface area to exceed 1000 m$^2$/cm. A preferred high porosity current collector substrate is nickel foam having 35–100 pores per square inch.

ADHESION PROMOTING AGENTS

Useful adhesion promoting agents (for improved adhesive communication between cathode active material and current collector substrate) include the following: Silanes including:
- vinyltriethoxy silane
- vinyl tris-(beta-methoxyethoxy) silane
- gamma-methacryloxypropylmethoxy silane
- beta-(3-4 epoxycyclohexyl) ethyltrimethoxy silane
- gamma glycidoxypropyltrimethoxy silane
- n-beta-(aminoethyl) gamma-aminopropyltrimethoxysilane
- gamma-chloropropyltrimethoxysilane
- gamma-mercaptopropyltrimethoxy silane or similar silane agents that will not electrolytically interact with cathode active materials and other battery materials.

Titanates including:
- monoalkyl titanates (e.g., isopropyltitanate)
- monoalkylphosphotitanates [e.g., tri (dioctylpyrophosphate) titanate]
- chelate titanates [e.g., titanium di (dioctylphosphate) oxyacetate]
- coordinated titanates [e.g., tetraoctyloxytitanium di (dilaurylphosphate) titanate].

Preferred adhesion promoting agents are vinyltriethoxy silane and vinyl tris-(beta-methoxyethoxy) silane.

The process of the present invention will be illustrated by the following representative examples thereof.

EXAMPLE 1

A mixture was formed by blending together 75 g. of 1:1 mixed titanium disulfide-titanium trisulfide, 20 g. of carbon black and 5 g. of polyethylene.

50 g. of the mixture was slurried with 100 g. of butyl Carbitol (i.e., diethylene glycol butyl ether).

90 g. of nickel foam having 35–100 pores per square inch was treated by vacuum impregnating 10 g. of vinyltriethoxy silane thereon and the silane-treated nickel foam was dried.

The slurry was applied to the silane-treated and dried nickel foam by vacuum impregnation for a weight pickup of 125 mg/cm$^2$.

The nickel foam was heated in an argon atmosphere at about 150° C. to drive off the butyl Carbitol and coalesce the polyethylene.

The so-prepared cathode was used in a lithium non-aqueous secondary cell configuration. The cell properties were as follows: internal resistance—1.2 ohms; discharge current—2 mA; and discharge current density—1.25 mA/cm$^2$.

EXAMPLE 2

A mixture was formed by blending together 75 g. of titanium disulfide, 20 g. of titanium carbide and 5 g. of polytetrafluoroethylene.

50 g. of the mixture was slurried with 50 g. of high purity water-free acetone (distilled or dried over lithium powder).

90 g. of nickel foam having 35-100 pores per square inch was blown with argon to open the foam pore sturcture against blockage. The nickel foam was treated by vacuum impregnating 10 g. of vinyl tris (beta-methoxyethoxy) silane, blown again with argon and gently dried under vacuum or under argon.

The slurry was applied to the silane-treated and dried nickel foam by vacuum impregnation fllowed by gently blowing with high purity argon for a weight pickup of 50 mg/cm$^2$.

The nickel foam was heated in an argon atmosphere at 90° C. to drive off the acetone and then the temperature was raised to 350° C. to coalesce the polytetrafluoroethylene.

The so-prepared cathode in a lithium non-aqueous secondary cell configuration yielded the following cell properties: open cell voltage—3.03 volts; internal resistance—4.9 ohms; discharge current—9 mA; discharge current density—1.20 mA/cm$^2$; and discharge time—38 minutes.

The process of the present invention can be used to create high porosity cathodes for high current density (>1.0 mA/cm$^2$), high energy density, low internal resistance (<10 ohms), lithium intercalation non-aqueous secondary batteries. The techniques described can also be used for primary energy conversion devices including fuel cells, solar energy photochemical devices and catalysis systems.

What is claimed is:

1. A method of making a chalcogenide cathode which comprises:
   (a) forming a mixture containing at least one intercalatable layered transition metal chalcogenide cathode active material, a conductivity enhancing agent and a binding agent;
   (b) forming a slurry containing the mixture and a vehicle therefor;
   (c) treating a high porosity current collector substrate by applying an adhesion promoting agent thereon and drying the treated substrate;
   (d) applying the slurry to the treated and dried substrate; and
   (e) heating the substrate in an inert atmosphere to drive off the vehicle and coalesce the binding agent.

2. A method according to claim 1 which comprises:
   (a) forming a mixture containing from about 45% to about 90% by weight of at least one intercalatable layered transition metal chalcogenide cathode active material, from about 1% to about 46% by weight of a conductivity enhancing agent and from about 1% to about 10% by weight of a binding agent;
   (b) forming a slurry containing from about 20% to about 80% by weight of the mixture and from about 80% to about 20% by weight of a vehicle therefor;
   (c) treating a high porosity current collector substrate having about 10-1000 pores per square inch by applying an adhesion promoting agent thereon in an amount of from about 5% to about 35% by weight and drying the treated substrate;
   (d) applying the slurry to the treated and dried substrate for a weight pickup of from about 10 mg/cm$^2$ to about 300 mg/cm$^2$; and
   (e) heating the substrate in an inert atmosphere at a temperature of from about 10° C. to about 350° C. to drive off the vehicle and coalesce the binding agent.

3. A method according to claim 1 which comprises:
   (a) forming a mixture containing about 75% by weight of mixed titanium disulfide—titanium trisulfide, about 20% by weight of carbon black and about 5% by weight of polyethylene;
   (b) forming a slurry containing about 33% by weight of the mixture and about 67% by weight of diethylene
   (c) treating nickel foam having about 35-100 pores per square inch by vacuum impregnating vinyltriethoxy silane thereon in an amount of about 10% by weight and drying the treated nickel foam;
   (d) applying the slurry to the treated and dried nickel foam by vacuum impregnation for a weight pickup of about 125 mg/cm$^2$; and
   (e) heating the nickel foam in an argon atmosphere at a temperature of about 150° C. to drive off the diethylene glycol butyl ether and coalesce the polyethylene.

4. A method according to claim 1 which comprises:
   (a) forming a mixture containing about 75% by weight of titanium disulfide, about 20% by weight of titanium carbide and about 5% by weight of polytetrafluoroethylene;
   (b) forming a slurry containing about 50% by weight of the mixture and about 50% by weight of acetone;
   (c) treating nickel foam having about 35-100 pores per square inch by vacuum impregnating vinyl tris-(beta-methoxyethoxy) silane thereon in an amount of about 10% by weight and drying the treated nickel foam;
   (d) applying the slurry to the treated and dried nickel foam by vacuum impregnation for a weight pickup of about 50 mg/cm$^2$; and
   (e) heating the nickel foam in an argon atmosphere at a temperature of about 90° C. to drive off the acetone and then at a temperature of about 350° C. to coalesce the polytetrafluoroethylene.

* * * * *

UNITED STATES PATENT AND TRADEMARK OFFICE
CERTIFICATE OF CORRECTION

PATENT NO. : 4,416,915
DATED : November 22, 1983
INVENTOR(S) : David N. Palmer et al It is certified that error appears in the above—identified patent and that said Letters Patent is hereby corrected as shown below:

Col. 6, line 32, after "ene" insert -- glycol butyl ether; --.

Signed and Sealed this

Sixth Day of March 1984

[SEAL]

Attest:

GERALD J. MOSSINGHOFF

*Attesting Officer*   *Commissioner of Patents and Trademarks*